United States Patent
Gimby

[11] Patent Number: 5,413,137
[45] Date of Patent: May 9, 1995

[54] FUEL VAPOR VENT ASSEMBLY WITH LIQUID TRAP

[75] Inventor: David R. Gimby, Livonia, Mich.

[73] Assignee: Borg-Warner Automotive, Inc., Sterling Heights, Mich.

[21] Appl. No.: 195,229

[22] Filed: Feb. 14, 1994

[51] Int. Cl.⁶ .............................. F16K 17/36
[52] U.S. Cl. ......................... 137/200; 137/43; 137/197
[58] Field of Search ............... 137/43, 197, 200, 587; 123/519

[56] References Cited

U.S. PATENT DOCUMENTS

| | | | |
|---|---|---|---|
| 2,880,744 | 4/1959 | Daley | 137/197 |
| 4,794,942 | 1/1989 | Yasuda | 137/197 |
| 5,044,389 | 9/1991 | Gimby | 137/39 |

Primary Examiner—Robert G. Nilson
Attorney, Agent, or Firm—Reising, Ethington et al.; Greg Dziegielewski

[57] ABSTRACT

A fuel vapor vent assembly with liquid trap is incorporated in a vent valve mounted on a motor vehicle fuel tank. The vent valve operates to vent the fuel tank through a vertically oriented orifice in the vent assembly when the valve is in a normal upright position and closes the orifice when the fuel tank together with the valve is tipped to a significant degree from this position. An elevated liquid trap is provided in the vent assembly at the outlet of the orifice that traps liquid from the venting fuel vapor while permitting venting to continue therethrough and then drains the trapped liquid back past the valve into the tank when the pressure in the latter is relieved. An insert mounted in the valve body is adapted to define both the orifice and liquid trap.

9 Claims, 2 Drawing Sheets

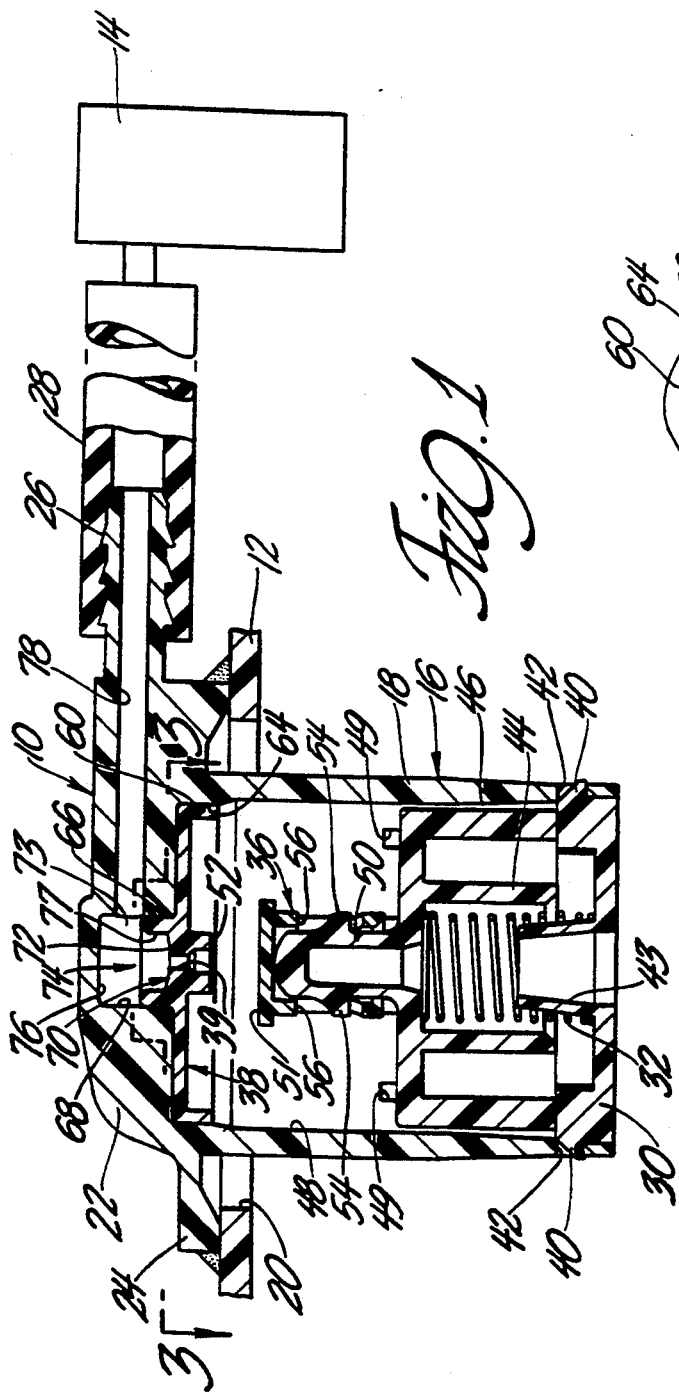
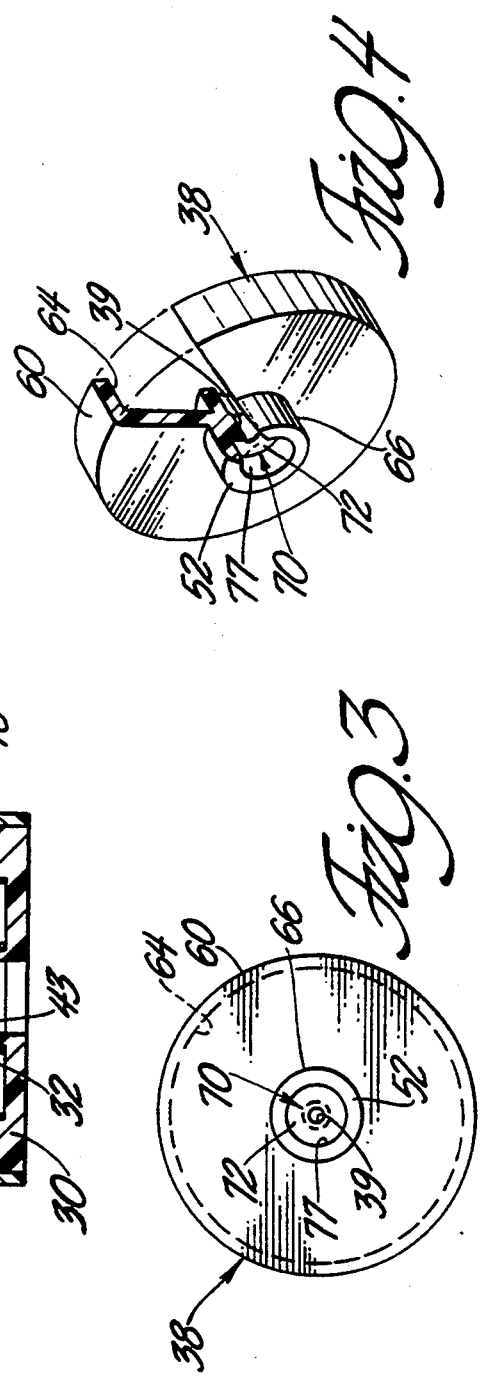

FUEL VAPOR VENT ASSEMBLY WITH LIQUID TRAP

TECHNICAL FIELD

This invention relates to fuel vapor vents and more particularly to fuel vapor vents with a liquid trap for use with a motor vehicle fuel tank.

BACKGROUND OF THE INVENTION

In the typical fuel vapor vent valve for a motor vehicle fuel tank wherein the valve is adapted to prevent spillage in case of shaking, tilting or rollover of the vehicle, the valve normally opens the fuel tank to an orifice that is connected by a vapor exit passage in the valve body to a vapor hose leading to a fuel vapor storage device. The valve body is commonly made as a one-piece plastic injected molded part that for simplicity of design has a simple direct connection between the orifice and the vapor exit passage. However, this connection has a tendency to collect and pass any liquid fuel issuing from the orifice under pressure from the tank on to the vapor storage canister. The latter contains a fuel vapor absorber such as carbon and any liquid fuel delivered thereto will quickly reduce its vapor adsorbing ability. It is difficult to configure the top of the molded body with a vapor exit passage connection that would somehow trap this liquid after it passes through the orifice and then drain the trapped liquid back to the tank. This is also the case where the valve is omitted and only venting is provided through an orifice in a vent body that mounts on the fuel tank.

As to any such possible fuel drainage back to the tank in the case of a vent assembly having a valve that is adapted to block the orifice on overfill, vehicle shaking, tilting and/or vehicle rollover, there is also the consideration of avoiding conflict with the operation of the valve as it is required to provide for normal venting operation in an upright position but close under these various circumstances to block exit of fuel from the tank. Any such drainage path for liquid fuel trapped downstream of the orifice can not provide a possible path for fuel vapor to vent around the valve in the normal upright attitude of the tank or allow liquid fuel to escape from the tank when tipped or inverted.

SUMMARY OF THE PRESENT INVENTION

The present invention offers a cost effective solution to the above problem with a very simple fuel vapor vent assembly that is adaptive to where only a fuel tank vent orifice is needed and also where a float or gravity operated valve is required to be associated therewith. In either case, there is typically a one-piece molded plastic body that is adapted to be mounted on the top of the fuel tank with the vent connected by a hose to the vapor storage canister. The present invention embodies a fuel impervious insert that is adapted to be mounted in such a vent or vent valve body and defines both a vertically oriented vent orifice and a liquid basin extending about the exit of this orifice. A simple cavity formed in the interior of the top of the plastic body co-operates with the basin in the insert to define an expansive chamber elevated above the orifice and this chamber communicates the orifice with a horizontal vapor exit passage in the plastic body adapted to be connected to a vapor storage device.

The expansive chamber forms an elevated liquid trap at the exit of the orifice that traps liquid from the venting fuel vapor while permitting venting to continue therethrough and then drains the trapped liquid in the basin back into the tank through the orifice in the insert when the pressure in the fuel tank is relieved. The liquid trapping chamber has a ceiling directly opposite the orifice dead ending the vapor stream issuing therefrom and the vapor exit passage is connected to the expansive chamber at a point above the basin. These features combine to aid in separating any liquid fuel out from the vapor and down into the basin and prevent it from passing on to the vapor exit passage and thence to the vapor storage canister.

It is therefore an object of the present invention to provide a new and improved fuel vapor vent device that prevents liquid fuel from being passed on to a fuel vapor storage device.

Another object is to provide a fuel vapor vent device for a motor vehicle fuel tank having an insert that defines both a vent orifice and a liquid fuel trap.

Another object is to provide a fuel vapor vent device for a motor vehicle fuel tank having an insert that defines both a vent orifice and a liquid fuel trap and is mounted in a body on the tank and traps liquid fuel passing through the vent orifice before it reaches a vapor storage device and drains the trapped liquid back to the tank through the vent orifice.

Another object is to provide a fuel vapor vent device that mounts on the top of a motor vehicle fuel tank and has an insert that defines both an orifice for venting the fuel tank and also a liquid trap for trapping liquid fuel passing through the orifice and draining the trapped liquid back to the tank when the vapor pressure is relieved and wherein the orifice may be controlled by a valve that closes the orifice in the event of overfill, tilting and/vehicle rollover.

Another object is to provide a motor vehicle fuel tank vapor vent device having a fuel impervious plastic body with a fuel impervious insert that defines a vertically oriented vent orifice and also co-operates with a cavity in the body to define a liquid fuel trapping chamber connecting the orifice to a horizontal vapor exit passage extending transverse to the orifice.

Another object is to provide a motor vehicle fuel tank vapor vent device having a combined vent orifice and liquid fuel trap incorporated therein that is simple to manufacture.

These and other objects, advantages and features of the present invention will become more apparent from the following description and accompanying drawings wherein:

BRIEF DESCRIPTION OF THE DRAWINGS

FIG. 1 is a sectional view of a motor vehicle fuel tank vapor vent valve assembly with a liquid fuel trap constructed in accordance with the present invention;

FIG. 3 is a view (top view) of the insert that defines the vent orifice and liquid trap taken along the line 2—2 in FIG. 1 when looking in the direction of the arrows; and FIG. 4 is a perspective view of the insert in FIG. 1 that defines the vent orifice and liquid fuel trap.

DETAILED DESCRIPTION OF THE PREFERRED EMBODIMENT

Figure 2:
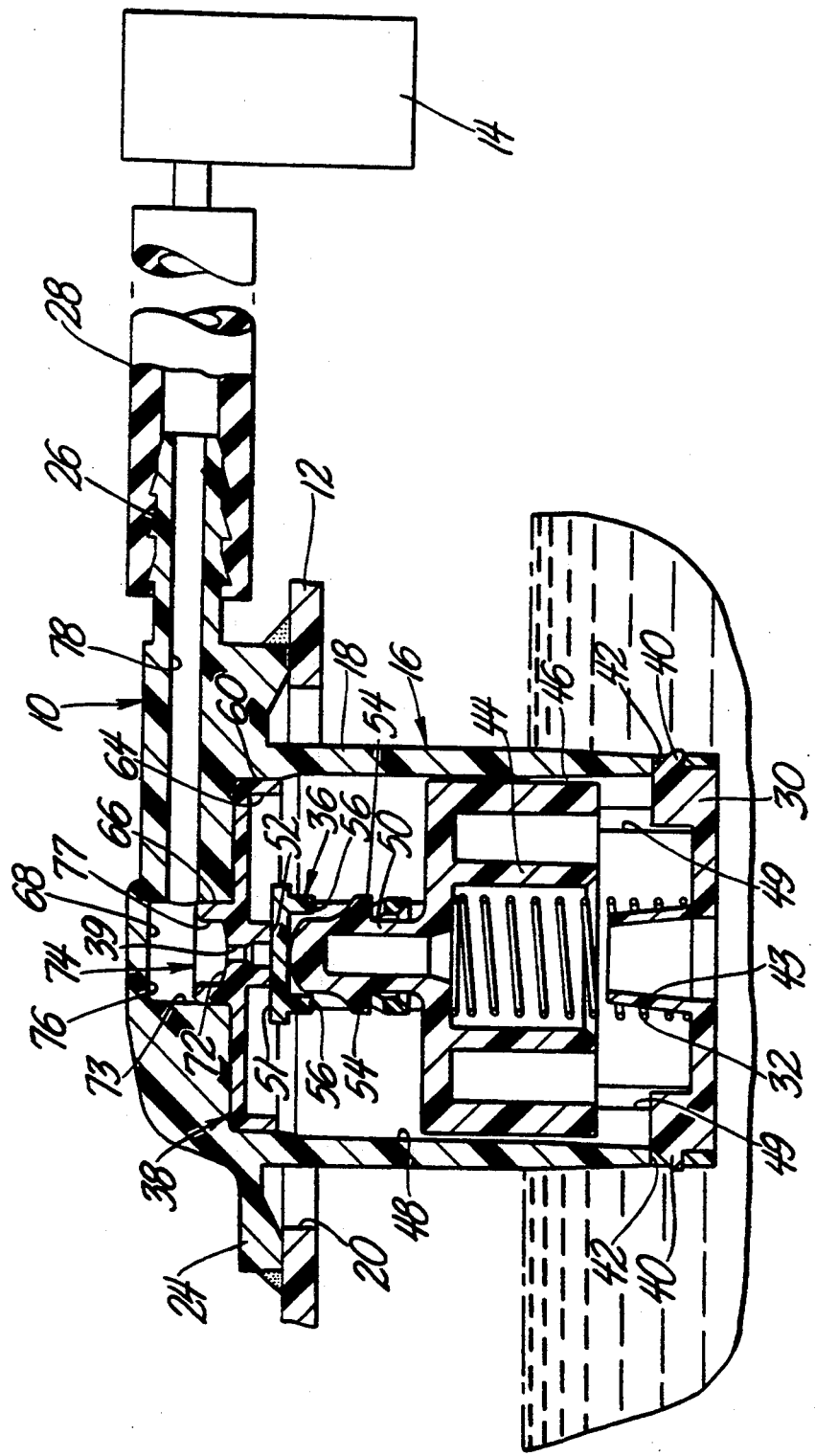
FIG. 2 is a view like FIG. 2 of the valve assembly but showing the valve closed.

Referring to FIG. 1, there is illustrated a fuel vapor vent valve device 10 for venting a motor vehicle fuel tank 12 to a fuel vapor storage canister 14 containing a fuel absorber such as carbon. The fuel tank 12 is made of high density polyethylene (HDPE) as is the body 16 of the valve device, this material being selected for its high strength and resistance to gasoline fuel.

The body 16 has a generally cylindrical valve containing section 18 received in an opening 20 in the top of the fuel tank and a closed upper end or top 22 having a radially outwardly extending annular flange 24 that abuts with the tank about the opening 20. The flange 24 is welded about its perimeter to the tank to sealingly secure the fuel vapor vent valve device in place in a normal vertically oriented or upright position as shown. The valve body top 22 has an integrally formed hose fitting 26 by which the fuel vapor vent valve device is adapted to be connected by a hose 28 to the vapor storage canister 14. Mounted in the valve body are a spring seat 30, spring 32, float 34, valve 36 and an insert 38 with a central vent orifice 39 through which the fuel vapor is vented from the tank to the canister 14.

The spring seat 30 has an annular shape with outwardly projecting hooks 40 that have a snap fit with apertures 42 in the lower end of the valve body to retain the seat and thereby the valve assembly together. The seat 30 has a central upstanding annular collar 43 about which the spring 32 is received and through which fuel vapors from the fuel tank can enter the valve body beneath the float 34. The spring 32 rests on the seat 30 and is received at its upper end in a centrally located downwardly extending collar 44 in the lower end of the float 34. The float 34 rests on the spring 32 and has an outer cylindrical surface 46 slidable in a vertical direction along an interior cylindrical wall 48 of the valve body. Sufficient clearance is provided between the float 34 and the cylinder wall 48 to freely allow fuel vapors to pass therebetween from beneath the float. Fuel vapor from the tank is also permitted to enter the valve body section 18 through vertical slots 49 in the valve body at the side of the float 34 with these slots allowing the fuel vapor to continue to enter above the float when the latter bottoms on the seat 30.

The float 34 has a central upwardly extending hollow mast 50 on which the valve 36 is mounted and moved by the float to close the orifice 39. For such closure, the valve 36 is formed with a hat shape having a flat circular valve face 51 on the top thereof that contacts with a planar annular seat 52 on the insert 38 located downward of and extending about the orifice 39. To assure that tight valve seating occurs when the float is tipped, the valve 36 is connected to the mast 50 by radially outwardly projecting hooks 54 formed on the latter that snap fit loosely in slots 56 in a central downwardly extending collar 58 of the valve. The loose connection 54,56 allows the valve 36 to axially align with the valve seat 52 when the float is tipped to any extent causing misalignment of the float 34 when acting to close the valve.

The insert 38 is preferably made of acetal copolymer that is highly resistant to fuel permeation and has a circular shape with a downwardly extending outer annular flange 60 having an interference fit in a stepped cylindrical bore 64 in the upper interior end of the valve body top 22. The insert 38 further has a centrally located upwardly extending cylindrical portion or neck 66 that has a press fit in the lower half of a cylindrical blind bore or cavity 68 that is also formed in the upper interior end of the valve body top 22 and adjoins the stepped bore 64. In the upper end of the insert's cylindrical portion 66 there is formed a cavity or basin 70 that is centrally intersected at its bottom 72 by the orifice 39 and serves as a trap to trap liquid fuel as described in more detail later. The basin 70 in the insert co-operates with the upper portion 73 of the cavity 68 in the valve body to define an expansive chamber 74 for receiving the fuel vapor wherein the ceiling 76 of the chamber is located directly above and opposite the orifice 39. The basin has a generally cylindrical side wall 77 and constitutes about half the volume of the chamber 74. A horizontal vapor exit passage 78 in the upper end of the valve body connects the chamber 74 at a point above the basin 70 with the hose fitting 26.

The weight of the float 34 and valve 36 is such that it deflects the spring 32 to the point where the float rest on the seat 30 when the fuel level is below the float as illustrated in FIG. 1. The buoyancy of the float 34 in the normal upright position is slightly greater than its weight so that the fuel level on reaching the float causes the latter to rise and eventually close the orifice 39 with the valve 36 as illustrated in FIG. 2 to prevent overfill from reaching the carbon containing canister. The spring 32 then also provides an addition closure force. The spring 32 is also effective to force the valve 36 to close the orifice 39 when the float is tipped to a significant degree such as 90 degrees from the upright position as can occur with severe tilting or a partial rollover of the vehicle. When the float and valve are inverted, such as can occur in a vehicle rollover, the buoyancy of the float is much less than its weight so that the valve is closed with a high sealing force to prevent liquid fuel from escaping from the tank.

Having described the function of the float operated valve 36 in preventing fuel spillage from the tank, there will now be described the venting function with the prevention of liquid fuel from then being passed on to the carbon containing canister. Whenever the valve 36 is moved by the float to open the orifice 39, fuel vapor developing in the top of the tank above the fuel level passes through the orifice under pressure from the tank. The fuel vapor enters the chamber 74 and any liquid carried therewith is caused to impinge on the ceiling 76 and drain down into the basin 70 rather than being carried along with the vapor out the vapor exit passage 78. The passage 78 is at right angles to the orifice 39 chamber and thus further discourages the liquid from entering same and being passed on to the carbon containing canister. The basin is sized according to the relatively small amount of liquid that tends to pass through the orifice in a typical venting time period and the vapor under pressure is able to pass through the small quantity of liquid trapped in the basin without pushing the liquid into the vapor exit passage 78. Then when the pressure in the tank is relieved, the liquid trapped in the basin 70 drains back through the orifice 39 and past the valve 36 into the tank. The bottom 70 of the basin is provided with a funnel shape that terminates at the centrally located orifice 39 to facilitate this drainage. Furthermore, the vapor exit passage 78, because it plays no part in forming the liquid trapping chamber 74, may be a simple cylindrical bore as illustrated permitting its formation with a simple core pin in the molding of the valve body 18.

The invention has been described in an illustrative manner with respect to one embodiment, and it is to be understood that the terminology that has been used is intended to be in the nature of words of description rather than of limitation. Obviously, many modifications and variations of the present invention in light of the above teachings may be made. For example, the invention has been illustrated as adapted to a vent valve assembly wherein the valve is operated with a float but the valve could also be operated with a gravity device that responds to tilting of the tank to close the orifice. Or the valve could be omitted altogether according to a particular motor vehicle fuel tank requirement. It is therefore to be understood that within the scope of the appended claims, the invention may be practiced otherwise than as specifically shown and described.

What is claimed is:

1. A fuel vapor vent assembly adapted to be mounted in the top of a motor vehicle fuel tank, said assembly comprising a body having an entry passage adapted to be open to liquid fuel and fuel vapor and a vapor exit passage adapted to be connected to a fuel vapor storage device, an insert mounted in said body having a normally generally vertically oriented orifice, said orifice having an entrance and an exit elevated above said entrance, said insert further having a basin extending about said exit of said orifice, and said body having a cavity co-operating with said basin to define an expansive chamber above said exit and connected to said vapor exit passage and adapted to trap liquid fuel from fuel vapor passing under pressure through said orifice before said liquid fuel can reach said vapor exit passage.

2. A fuel vapor vent assembly as set forth in claim 1 wherein said vapor exit passage extends transverse to said orifice and is connected to said expansive chamber at a point above said basin.

3. A fuel vapor vent assembly as set forth in claim 1 wherein said insert has an outer downwardly extending annular flange received with an interference fit in a stepped cylindrical bore in said body below said cavity, and said insert further having a central upwardly extending cylindrical collar containing said basin and received with a press fit in a lower portion of said cavity.

4. A fuel vapor vent assembly as set forth in claim 1 wherein said expansive chamber has a ceiling directly above and opposite said orifice and said basin has a funnel shaped bottom.

5. A fuel vapor vent assembly as set forth in claim 1 wherein said basin comprises about half of said expansive chamber.

6. A fuel vapor vent assembly as set forth in claim 1 wherein said insert has an upstanding cylindrical collar portion containing said basin and is received with a press fit in said cavity below said vapor exit passage.

7. A fuel vapor vent assembly as set forth in claim 1 wherein said basin has a generally cylindrical side wall and a funnel shaped bottom.

8. A fuel vapor vent assembly as set forth in claim 1 wherein said basin comprises about half of said chamber and said orifice is central to said basin.

9. A fuel vapor vent assembly as set forth in claim 1 wherein said vapor exit passage is horizontal and transverse to said orifice.

* * * * *